United States Patent
Sexton et al.

(10) Patent No.: US 9,816,549 B2
(45) Date of Patent: *Nov. 14, 2017

(54) BEARING ASSEMBLY INCLUDING BEARING SUPPORT RING CONFIGURED TO REDUCE THERMAL WARPING DURING USE

(71) Applicant: US SYNTHETIC CORPORATION, Orem, UT (US)

(72) Inventors: Timothy N. Sexton, Bettendorf, IA (US); Craig H. Cooley, Saratoga Springs, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 332 days.

This patent is subject to a terminal disclaimer.

(21) Appl. No.: 14/322,771

(22) Filed: Jul. 2, 2014

(65) Prior Publication Data

US 2014/0314355 A1    Oct. 23, 2014

Related U.S. Application Data

(63) Continuation of application No. 12/854,337, filed on Aug. 11, 2010, now Pat. No. 8,800,686.

(51) Int. Cl.
*E21B 10/22* (2006.01)
*F16C 17/22* (2006.01)
(Continued)

(52) U.S. Cl.
CPC .............. *F16C 17/22* (2013.01); *E21B 4/003* (2013.01); *F16C 17/04* (2013.01); *F16C 27/08* (2013.01);
(Continued)

(58) Field of Classification Search
CPC .. F16C 33/043; F16C 2352/00; F16C 17/065; F16C 43/02; F16C 17/035; F16C 33/106;
(Continued)

(56) References Cited

U.S. PATENT DOCUMENTS 3,597,027 A    8/1971 Herndon
3,837,718 A    9/1974 Nattefort
(Continued)

FOREIGN PATENT DOCUMENTS

EP    0543461    5/1993
EP    0595630    5/1994
(Continued)

OTHER PUBLICATIONS

U.S. Appl. No. 14/675,323, filed Mar. 31, 2015, Cooley et al.
(Continued)

*Primary Examiner* — Kipp Wallace
(74) *Attorney, Agent, or Firm* — Dorsey & Whitney LLP

(57) ABSTRACT

Various embodiments relate to a bearing assembly including a support ring configured to reduce thermal warping under operational temperature conditions, a bearing apparatus that may utilize such a thrust-bearing assembly, and applications that incorporate the disclosed bearing apparatuses such as downhole motors in subterranean drilling systems, directional drilling systems, and many other apparatuses. In an embodiment, a bearing assembly includes a plurality of superhard bearing elements distributed circumferentially about an axis. The thrust-bearing assembly further includes a support ring having the plurality of superhard bearing elements mounted thereto. The support ring includes at least one thermal-warping-reducing feature configured to reduce a radial moment, compared to if the at least one thermal-warping-reducing feature were absent from the support ring, which is thermally induced in the support ring when the
(Continued)

support ring and the plurality of superhard bearing elements are exposed to operational temperature conditions.

24 Claims, 12 Drawing Sheets

(51) Int. Cl.
    *E21B 4/00* (2006.01)
    *F16C 17/04* (2006.01)
    *F16C 27/08* (2006.01)
    *F16C 33/04* (2006.01)
    *F16C 33/26* (2006.01)
    *F16C 33/10* (2006.01)

(52) U.S. Cl.
    CPC .......... *F16C 33/043* (2013.01); *F16C 33/108* (2013.01); *F16C 33/26* (2013.01); *F16C 2240/40* (2013.01); *F16C 2352/00* (2013.01)

(58) Field of Classification Search
    CPC .. F16C 33/1065; F16C 33/107; F16C 33/108; F16C 2202/22; F16C 27/08; E21B 4/003; E21B 10/22; E21B 10/23; E21B 10/24
    See application file for complete search history.

(56) References Cited

U.S. PATENT DOCUMENTS

| | | | |
|---|---|---|---|
| 4,141,605 A | 2/1979 | Riordan et al. | |
| 4,227,753 A | 10/1980 | Wilcock | |
| 4,437,215 A | 3/1984 | Nozue et al. | |
| 4,560,014 A * | 12/1985 | Geczy | E21B 4/003 175/107 |
| 4,732,491 A * | 3/1988 | Geczy | E21B 4/003 175/320 |
| 4,854,401 A * | 8/1989 | Kruger | E21B 4/003 175/107 |
| 5,043,796 A | 8/1991 | Lester | |
| 5,364,192 A | 11/1994 | Damm et al. | |
| 5,366,298 A | 11/1994 | Toshimitsu et al. | |
| 5,626,470 A | 5/1997 | Gerhardt | |
| 5,660,481 A | 8/1997 | Ide | |
| 6,460,635 B1 | 10/2002 | Kalsi et al. | |
| 6,461,129 B2 | 10/2002 | Liu | |
| 7,842,111 B1 | 11/2010 | Sani | |
| 7,866,418 B2 | 1/2011 | Bertagnolli et al. | |
| 7,901,137 B1 | 3/2011 | Peterson | |
| 2004/0190804 A1 | 9/2004 | John et al. | |
| 2006/0171616 A1 | 8/2006 | Richie et al. | |
| 2006/0273683 A1 * | 12/2006 | Caprio | H02K 17/165 310/211 |
| 2008/0035246 A1 | 2/2008 | Kawamura et al. | |
| 2010/0218995 A1 | 9/2010 | Sexton et al. | |
| 2010/0237621 A1 | 9/2010 | Tessier et al. | |
| 2011/0197703 A1 | 8/2011 | Badre-Alam et al. | |
| 2012/0037425 A1 | 2/2012 | Sexton et al. | |
| 2012/0039551 A1 | 2/2012 | Cooley et al. | |
| 2015/0204382 A1 | 7/2015 | Cooley et al. | |

FOREIGN PATENT DOCUMENTS

| | | |
|---|---|---|
| GB | 1392245 | 4/1975 |
| WO | WO 2009/015338 | 1/2009 |

OTHER PUBLICATIONS

U.S. Appl. No. 12/854,337, mailed Jul. 23, 2014, Issue Notification.
U.S. Appl. No. 13/241,412, mailed Jul. 14, 2014, Office Action.
U.S. Appl. No. 13/241,412, mailed Jan. 20, 2015, Notice of Allowance.
U.S. Appl. No. 13/241,412, mailed Apr. 8, 2015, Issue Notification.
U.S. Appl. No. 13/070,633, mailed Jul. 9, 2014, Issue Notification.
U.S. Appl. No. 13/070,633, filed Mar. 24, 2011, Sexton et al.
U.S. Appl. No. 11/545,929, filed Oct. 10, 2006, Bertagnolli et al.
International Search Report and Written Opinion from International Application No. PCT/US2011/044774 mailed Dec. 13, 2012.
International Search Report and Written Opinion from International Application No. PCT/US2012/056407 mailed Dec. 7, 2012.
U.S. Appl. No. 12/854,337, mailed Nov. 19, 2012, Office Action.
U.S. Appl. No. 12/854,337, mailed May 7, 2013, Office Action.
U.S. Appl. No. 12/854,337, mailed Oct. 1, 2013, Office Action.
U.S. Appl. No. 12/854,337, mailed Apr. 8, 2014, Notice of Allowance.
U.S. Appl. No. 13/070,633, mailed Jul. 1, 2013, Office Action.
U.S. Appl. No. 13/070,633, mailed Oct. 16, 2013, Office Action.
U.S. Appl. No. 13/070,633, mailed Mar. 7, 2014, Notice of Allowance.
U.S. Appl. No. 13/070,633, mailed Jun. 30, 2014, Notice of Allowance.
U.S. Appl. No. 14/675,323, mailed Jun. 28, 2016, Office Action.
U.S. Appl. No. 14/675,323, dated Nov. 9, 2016, Notice of Allowance.
U.S. Appl. No. 14/675,323, dated Mar. 21, 2017, Issue Notification.

* cited by examiner

BEARING ASSEMBLY INCLUDING BEARING SUPPORT RING CONFIGURED TO REDUCE THERMAL WARPING DURING USE

CROSS-REFERENCE TO RELATED APPLICATIONS

This application is a continuation of U.S. application Ser. No. 12/854,337 filed on 11 Aug. 2010, the contents of which are incorporated herein, in their entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid is circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses.

The on-bottom and off-bottom thrust carried by the thrust-bearing apparatuses can be extremely large. The operational lifetime of the thrust-bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Various embodiments of the invention relate to a bearing assembly including a support ring configured to reduce thermal warping under operational temperature conditions, a bearing apparatus that may utilize such a bearing assembly, and systems that incorporate the disclosed bearing apparatuses such as downhole motors in subterranean drilling systems, directional drilling systems, and many other apparatuses. By reducing thermal warping in the support ring when it is exposed to elevated operational temperature conditions, the extent to which respective bearing surfaces of the bearing assembly are displaced out of plane from each other may be limited to thereby allow for hydrodynamic operation when used in a bearing apparatus.

In an embodiment, a bearing assembly includes a plurality of superhard bearing elements distributed circumferentially about an axis. The bearing assembly further includes a support ring having the plurality of superhard bearing elements mounted thereto. The support ring includes at least one thermal-warping-reducing feature configured to reduce a radial moment, compared to if the at least one thermal-warping-reducing feature were absent from the support ring, which is thermally induced in the support ring when the support ring and the plurality of superhard bearing elements are exposed to operational temperature conditions.

In an embodiment, a bearing apparatus includes two bearing assemblies. At least one of the two bearing assemblies may be configured as any of the disclosed bearing assembly embodiments that include a support ring configured to reduce thermal warping.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Various embodiments of the invention relate to a bearing assembly including a support ring configured to reduce thermal warping under operational temperature conditions and a bearing apparatuses that may utilize such a bearing assembly. By reducing thermal warping in the support ring when it is exposed to elevated operational temperature conditions, the extent to which respective bearing surfaces of the bearing assembly are displaced out of plane from each other may be limited to thereby allow for hydrodynamic operation (under certain conditions) when used in a bearing apparatus. The disclosed bearing apparatuses may be used in a number of applications, such as downhole motors in subterranean drilling systems, directional drilling systems, pumps, transmissions, gear boxes, and many other apparatuses.

Figure 1A:
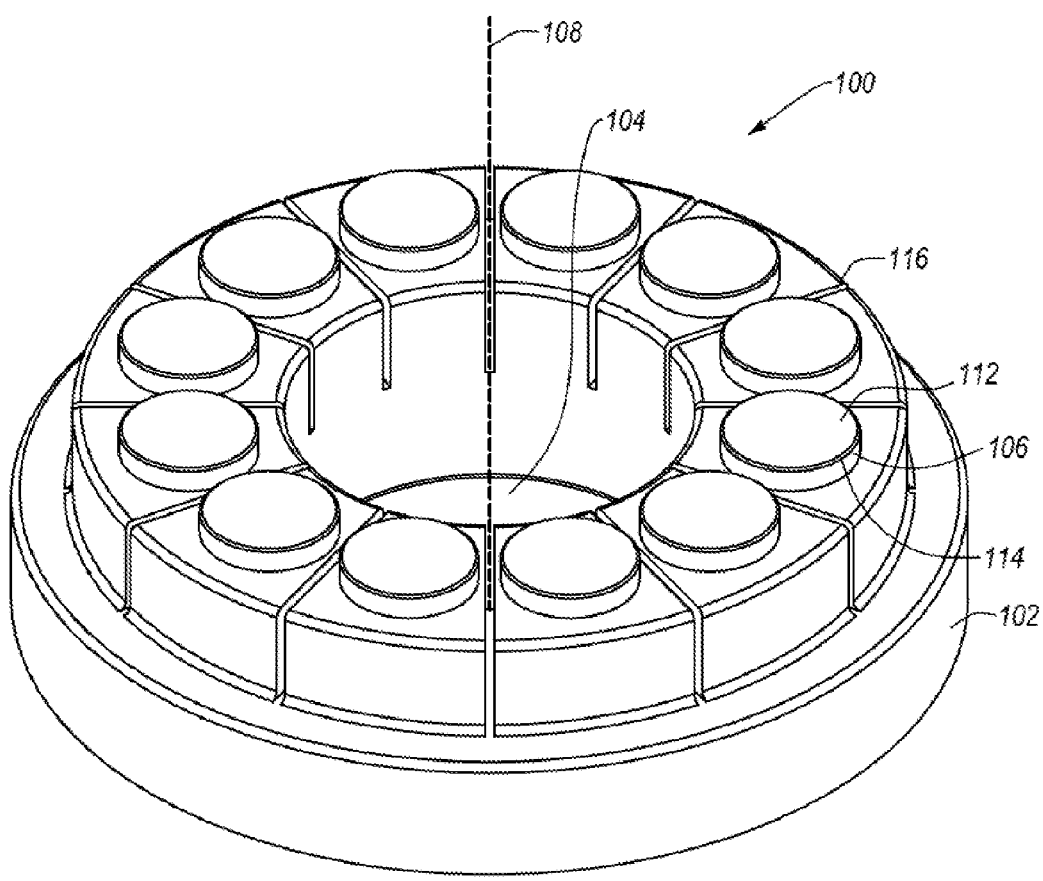
FIG. 1A is an isometric view of an embodiment of a thrust-bearing assembly including a support ring having a plurality of radially-extending slots therein configured to reduce thermal warping under operational temperature conditions.
Figure 1B:
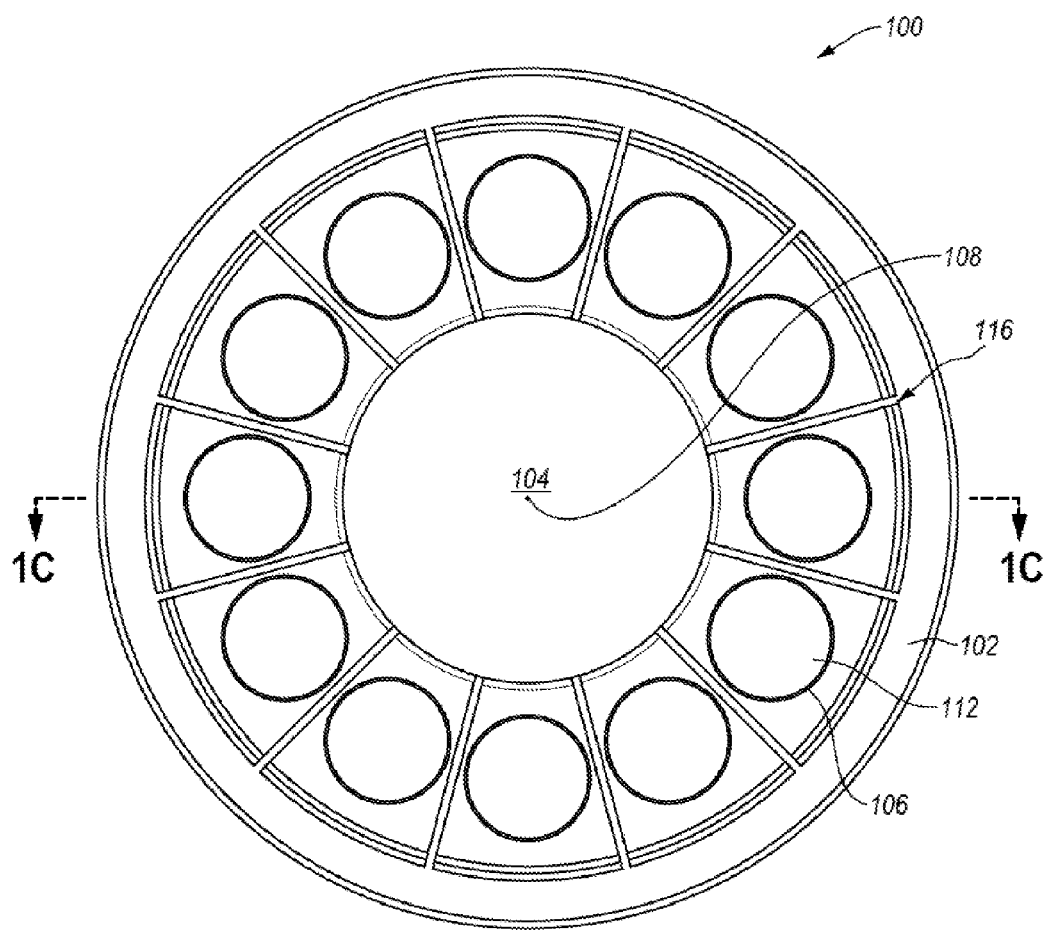
FIG. 1B is a top plan view of the thrust-bearing assembly shown in FIG. 1A.
Figure 1C:
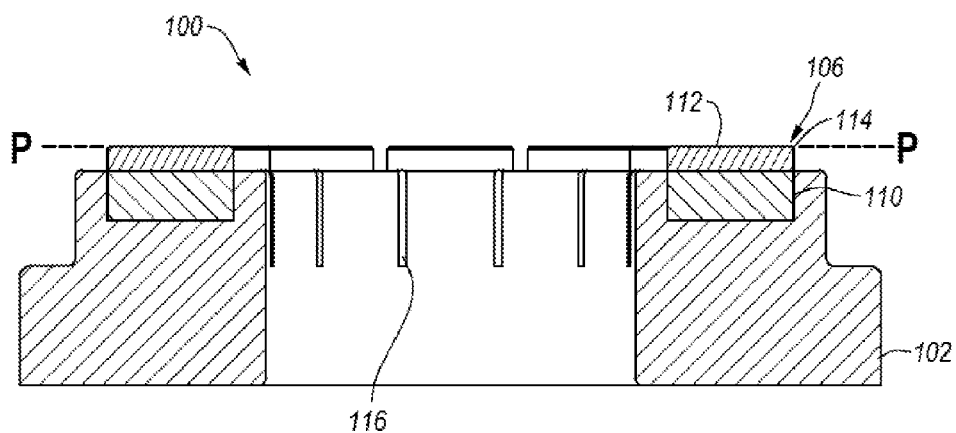
FIG. 1C is a side cross-sectional view of the thrust-bearing assembly shown in FIG. 1B taken along line 1C-1C.

FIGS. 1A-1C are isometric, top plan, and side cross-sectional views, respectively, of an embodiment of a thrust-bearing assembly 100. The thrust-bearing assembly 100 may form a stator or a rotor of a thrust-bearing apparatus used in a subterranean drilling system. The thrust-bearing assembly 100 includes a support ring 102 defining an opening 104 through which a shaft (not shown) of, for example, a downhole drilling motor may extend. The support ring 102 may be made from a variety of different materials. For example, the support ring 102 may comprise carbon steel, stainless steel, tungsten carbide, or another suitable material. The support ring 102 includes a plurality of recesses 110 (FIG. 1C) formed therein.

The thrust-bearing assembly 100 further includes a plurality of superhard bearing elements 106 that are distributed circumferentially about a thrust axis 108 along which a thrust force may be generally directed during use. As used herein, a superhard bearing element is a bearing element including a bearing surface that is made from a material exhibiting a hardness that is at least as hard as tungsten carbide. Although the superhard bearing elements 106 are illustrated as being cylindrical, in other embodiments, the superhard bearing elements 106 may be non-cylindrical such as oblong or other non-cylindrical geometry. Each superhard bearing element 106 is partially disposed in a corresponding one of the recesses 110 (FIG. 1C) of the support ring 102 and secured partially therein via brazing, press-fitting, fastening with a fastener, or another suitable technique. Each superhard bearing element 106 includes a bearing surface 112 that is substantially planar and generally lies in a common plane P (FIG. 1C) with the bearing surfaces 112 of the other superhard bearing elements 106. The superhard bearing elements 106 may be pre-machined to tolerances and mounted in the support ring 102 and/or mounted to the support ring 102 and the bearing surfaces 112 thereof and planarized (e.g., by lapping and/or grinding) so that the bearing surfaces 112 are all substantially coplanar. Optionally, one or more of the superhard bearing elements 106 may exhibit a peripherally-extending edge chamfer 114. However, in other embodiments, the edge chamfer 114 may be omitted.

The support ring 102 further includes a plurality of thermal-warping-reducing features 116, which compared to if they were absent, increase the compliance of the support ring 102 and reduce a radial moment that is thermal induced in the support ring 102 due to a temperature gradient in the support ring 102. The temperature of the thermal gradient in the support ring 102 increases with distance toward the bearing surfaces 112 of the superhard bearing elements 106 (i.e., the temperature is hottest at the bearing surfaces 112). The thermal gradient is generated by the frictional heat generated at the bearing surfaces 112 of the superhard bearing elements 106 during use. In the illustrated embodiment, each thermal-warping-reducing feature 116 is configured as a radially-extending slot that extends only partially through the support ring 102 in a thickness direction. Each radially-extending slot 116 may be disposed between immediately adjacent superhard bearing elements 106, and may be disposed circumferentially about halfway between immediately adjacent superhard bearing elements 106. For example, each radially-extending slot 116 may exhibit a width of about 0.0020 inch to about 0.100 inch, such as about 0.030 inch to about 0.050 inch, about 0.035 inch to about 0.045 inch, or about 0.010 inch to about 0.040 inch. However, in other embodiments, at least one, a portion of, or all of the thermal-warping-reducing features 116 may be configured as a recess, a blind or through hole, or other feature that departs from the depicted elongated geometry of the radially-extending slots. As will be discussed in more detail below, the radially-extending slots 116 increase the compliance of the support ring 102 compared to if they were absent. By increasing the compliance of the support ring 102, a radial moment that is thermally induced in the support ring 102 due to the temperature gradient in the support ring 102 may also be reduced. Such a configuration may enable the bearing surfaces 112 of the superhard bearing elements 106 to be displaced out of the plane P (if at all) by a relatively small amount.

Figure 1D:
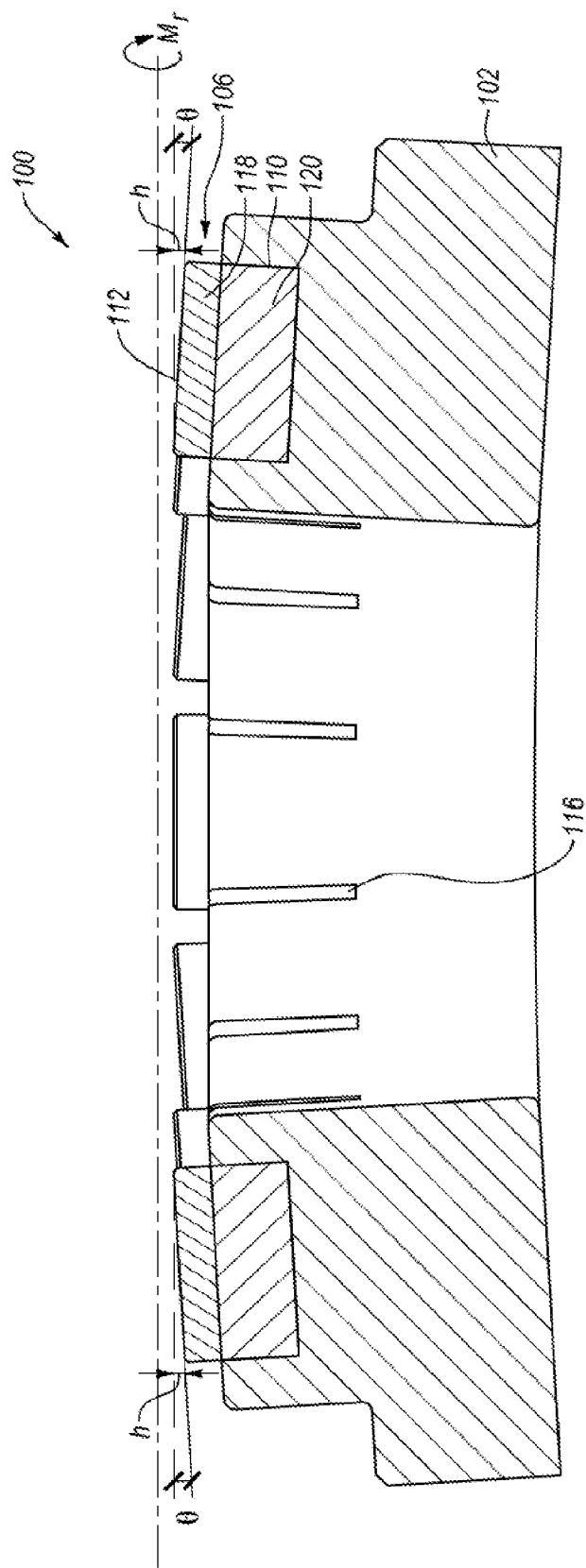
FIG. 1D is the side cross-sectional view of the thrust-bearing assembly shown in FIG. 1C depicting how the support ring warps under operational temperature conditions.

FIG. 1D is the side cross-sectional view of the thrust-bearing assembly 100 shown in FIG. 1C depicting how the support ring 102 can warp under operational temperature conditions. The operational temperature conditions are temperatures commonly experienced when the thrust-bearing assembly 100 is used in a downhole drilling motor. For example, the operational temperature conditions that the support ring 102 and the bulk of the superhard bearing elements 106 may be subjected to during downhole drilling operations are at least about 100° C., such as about 100° C. to about 200° C. or, more particularly, about 100° C. to about 150° C. Under operational temperature conditions, the support ring 102 warps (e.g., twists) due to a radial moment $M_r$ thermally induced therein due to the temperature gradient in the support ring 102, with the temperature of the thermal gradient increasing with distance toward the bearing surfaces 112 of the superhard bearing elements 106. At a maximum, under the operational temperature conditions, the support ring 102 may warp so that the bearing surfaces 112 of the superhard bearing elements 106 may be displaced out of plane by an angle θ, such as about 0.02 degrees to about 0.2 degrees. Stated another way, an outermost peripheral edge of each superhard bearing element 106 may be displaced out of plane by a distance h of about 0.00020 inch to about 0.0020 inch, such as about 0.0005 inch to about 0.0010 inch, which is also referred to as the maximum flatness.

The superhard bearing elements 106 may be made from a number of different superhard materials, such as polycrystalline diamond, polycrystalline cubic boron nitride, silicon carbide, tungsten carbide, or any combination of the foregoing superhard materials. In an embodiment, one or more of the superhard bearing elements 106 may include polycrystalline diamond. In some embodiments, the polycrystalline diamond may be leached to at least partially or substantially completely remove a metal-solvent catalyst (e.g., cobalt, iron, nickel, or alloys thereof) that was used to sinter precursor diamond particles that form the polycrystalline diamond. In other embodiments, the polycrystalline diamond may be unleached and include a metal-solvent catalyst (e.g., cobalt, iron, nickel, or alloys thereof) that was used to sinter the precursor diamond particles that form the polycrystalline diamond. In yet another embodiment (as illustrated), one or more of the superhard bearing elements 106 may be configured as a superhard compact with a superhard table 118 bonded to a substrate 120. For example, the superhard compact may be a PDC including a cobalt-cemented tungsten carbide substrate (substrate 120) having a polycrystalline diamond table (superhard table 118) that was sintered in a first high-pressure/high-temperature process on the substrate 120 or bonded to the substrate 120 in a bonding process (e.g., a second high-pressure/high-temperature process).

Figure 2A:
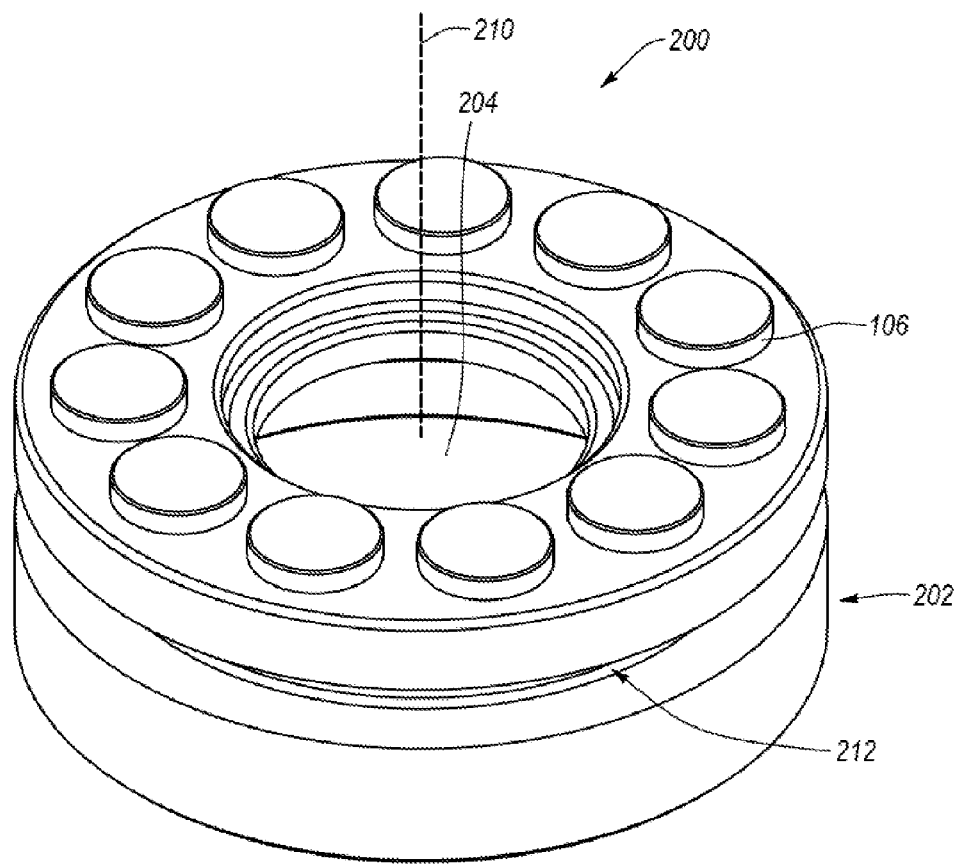
FIG. 2A is an isometric view of an embodiment of a thrust-bearing assembly including a support ring configured to accommodate minor thermal warping of another thrust-bearing assembly with which it is operably assembled.
Figure 2B:
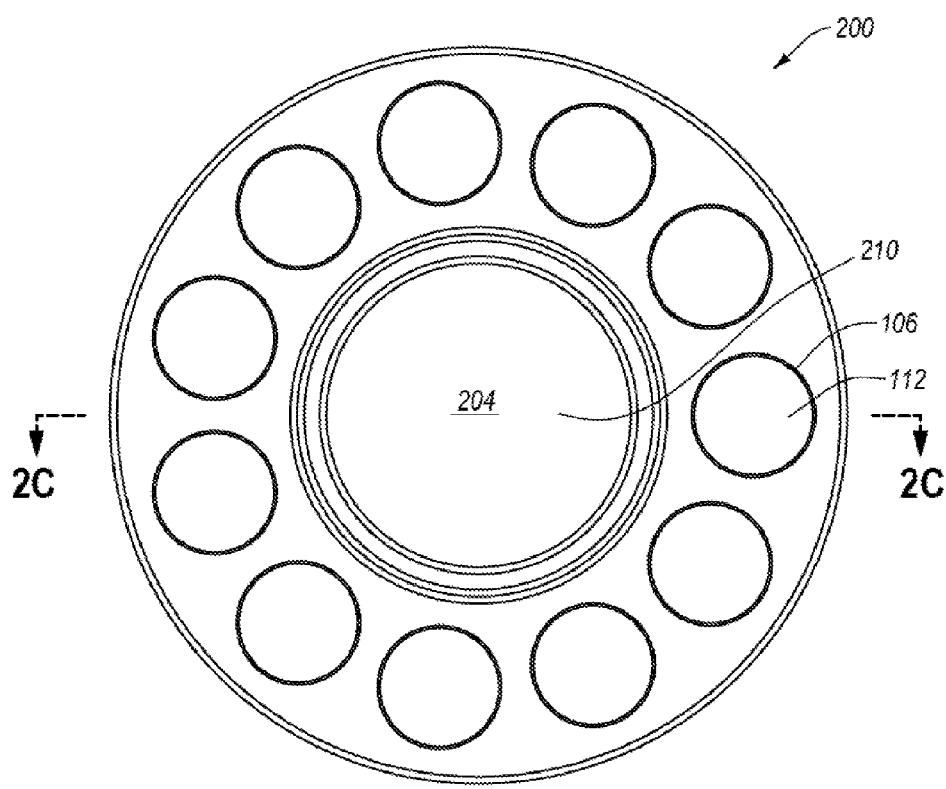
FIG. 2B is a top plan view of the thrust-bearing assembly shown in FIG. 2A.
Figure 2C:
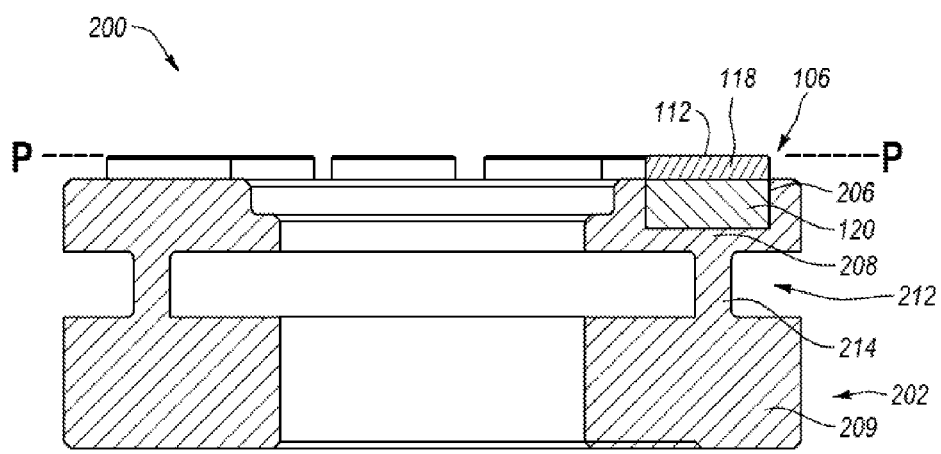
FIG. 2C is a side cross-sectional view of the thrust-bearing assembly shown in FIG. 2B taken along line 2C-2C.

FIGS. 2A-2C are isometric, plan, and side cross-sectional views, respectively, of an embodiment of a thrust-bearing assembly 200, which is suitable for use in a subterranean drilling system. The thrust-bearing assembly 200 may form a stator or a rotor of a thrust-bearing apparatus used in a subterranean drilling system. The thrust-bearing assembly 200 includes a support ring 202 defining an opening 204 through which a shaft (not shown) of, for example, a downhole drilling motor may extend. The support ring 202 includes a plurality of recesses 206 (FIG. 2C) formed therein that are partially defined by a circumferentially-extending upper base 208.

The thrust-bearing assembly 200 further includes a plurality of superhard bearing elements 106 that are distributed circumferentially about a thrust axis 210 along which a thrust force may be generally directed during use. Each superhard bearing element 106 is partially disposed in a corresponding one of the recesses 206 of the support ring 202 and supported on the upper base 208. For example, each superhard bearing element 106 may be secured partially within the corresponding one of the recesses 206 of the support ring 202 via brazing, press-fitting, fastening with a fastener, or another suitable technique. Each superhard bearing element 106 includes a bearing surface 112 that is substantially planar and generally lies in a common plane P (FIG. 2C) with the bearing surfaces 112 of the other superhard bearing elements 106. The superhard bearing elements 106 may be pre-machined to tolerances and mounted in the support ring 102 and/or mounted to the support ring 102 and the bearing surfaces 112 thereof planarized (e.g., by lapping and/or grinding) so that the bearing surfaces 112 are all substantially planar coplanar.

The support ring 202 further includes an outer circumferentially-extending recess 212 that is defined by the upper base 208, a circumferentially-extending flexible support 214, and a lower base 209. The recess 212 is positioned below the plurality of recesses 206. The recess 212 increases the compliance of the support ring 202 compared to if it were absent from the support ring 202. In an embodiment, the recess 212 may exhibit a thickness of about 0.250 inch to about 1.00 inch (e.g., about 0.300 inch to about 0.600 inch) and extend radially inwardly about 0.200 inch to about 0.500 inch (e.g., about 0.200 inch to about 0.300 inch).

Figure 2D:
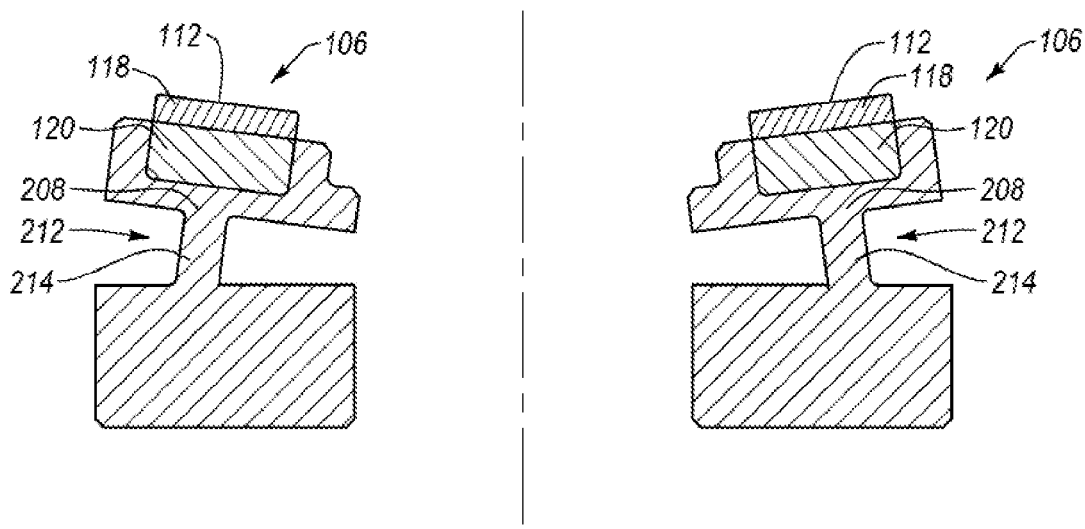
FIG. 2D is a simplified side cross-sectional view of the thrust-bearing assembly shown in FIG. 2C depicting how the support ring can bend.

As shown in the simplified side cross-sectional view of FIG. 2D, the upper base 208 carrying the superhard bearing elements 106 thereon may pivot when one or more of the superhard bearing elements 106 are loaded (e.g., at or near an edge of one or more of the bearing surfaces 112 of the superhard bearing elements 106). As illustrated, the upper base 208 may pivot radially inwardly in response to the bearing surfaces 112 of the superhard bearing elements 106 being loaded more at or near the inner most portion thereof so that the bearing surfaces 112 may accommodate the bearing surfaces of another thrust-bearing assembly being slightly out of plane with each other.

Figure 3A:
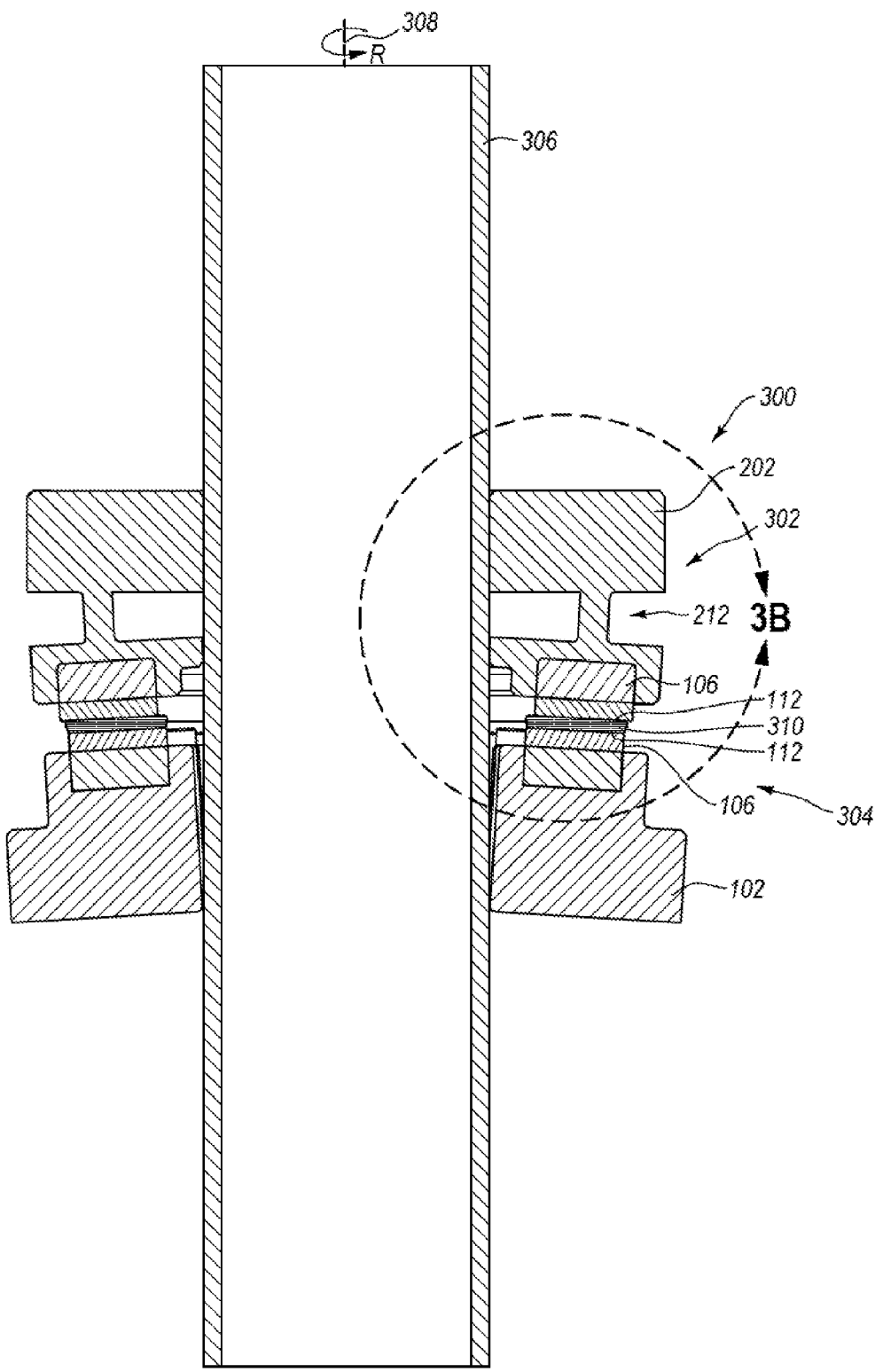
FIG. 3A is a side cross-sectional view of an embodiment of a thrust-bearing apparatus that may include a stator configured as the thrust-bearing apparatus shown in FIGS. 1A-1D and a rotor configured as the thrust-bearing apparatus shown in FIGS. 2A-2D.

Any of the previously described thrust-bearing assemblies may be used in a thrust-bearing apparatus that employs two thrust-bearing assemblies. FIG. 3A is an isometric view of an embodiment of a thrust-bearing apparatus 300. The thrust-bearing apparatus 300 includes a rotor 302 that is configured as the thrust-bearing assembly 100 shown in FIGS. 2A-2D and a stator 304 that is configured as the thrust-bearing assembly 100 shown in FIGS. 1A-1D. The rotor 302 may be attached to and rotate with a shaft 306. While the stator 304 is shown configured as the thrust-bearing assembly 100 shown in FIGS. 1A-1D, in other embodiments, the rotor 302 may be configured as the thrust-bearing assembly 100 and the stator 304 may be configured as the thrust-bearing assembly 200 shown in FIGS. 2A-2D.

The shaft 306 may, for example, be operably coupled to an apparatus capable of rotating the shaft 306 in a direction R (or in an opposite direction) about a rotation axis 308, such as a downhole motor. For example, the shaft 306 may extend through and may be secured to the rotor 302 by press-fitting or threadly coupling the shaft 306 to the rotor 302, or another suitable technique. The stator 304 is not connected to the shaft 306 and, therefore, remains stationary while the rotor 302 rotates. The respective bearing surfaces 112 of the superhard bearing elements 106 of the rotor 302 are oriented to generally oppose the respective bearing surfaces 112 of the superhard bearing elements 106 of the stator 304.

In operation, rotation of the rotor 302 at a sufficient rotational speed sweeps drilling fluid onto bearing surfaces 112 of the stator 304 and allows a fluid film 310 to develop between the bearing surfaces 112 of the stator 304 and the bearing surfaces 112 of the rotor 302. The fluid film 310 may develop under certain operational conditions in which the rotational speed of the rotor 302 is sufficiently great and the thrust load is sufficiently low. Under such hydrodynamic operational conditions, the pressure of the fluid film 310 is sufficient to prevent contact between the bearing surfaces 112 of the stator 304 and the bearing surfaces 112 of the rotor 302 and, thus, substantially reduce wear of the superhard bearing elements 106. When the thrust loads exceed a certain value and/or the rotational speed of the rotor 302 is reduced, the fluid film 310 may not be sufficient to prevent the bearing surfaces 112 of the stator 304 and the bearing surfaces 112 of the rotor 302 from contacting each other. Under such operational conditions, the thrust-bearing apparatus 300 is not operated as a hydrodynamic bearing. Under other operational conditions, the thrust-bearing apparatus 300 may be operated in a mixed mode in which the fluid film 310 is only partially developed to help reduce, but not prevent contact of the bearing surfaces 112 of the stator 304 and the bearing surfaces 112 of the rotor 302. Thus, under certain operational conditions, the thrust-bearing apparatus 300 may be operated hydrodynamically and under other conditions the thrust-bearing apparatus 300 may be operated so that the bearing surfaces 112 contact each other during use or a partially developed fluid film is present between the bearing surfaces 112 during use. However, the superhard bearing elements 106 are sufficiently wear-resistant to accommodate repetitive contact with each other, such as during start-up and shut-down of a subterranean drilling system employing the thrust-bearing apparatus 300 or other operational conditions not favorable for forming the fluid film 310.

Figure 3B:
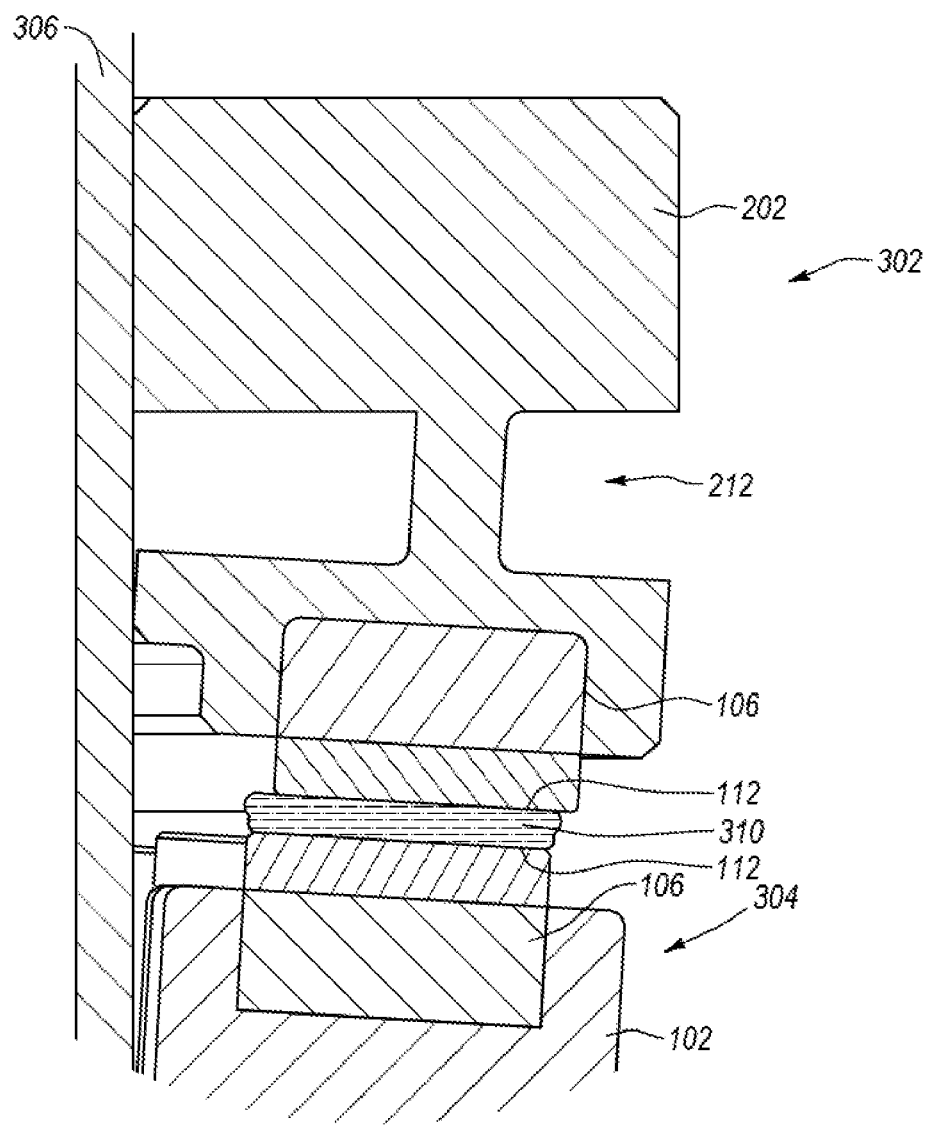
FIG. 3B is an enlarged cross-sectional view of the thrust-bearing apparatus shown in FIG. 3A illustrating how the support ring of the rotor can bend to accommodate minor thermal warping of the support ring of the stator.

Referring to FIG. 3B, which is an enlarged side cross-sectional view of FIG. 3A, illustrating how the support ring 202 of the rotor 304 can bend to accommodate minor thermal warping of the support ring 102 of the stator 304. The configuration of the support ring 202 of the rotor 302 enables the support ring 202 to flex so that the bearing surfaces 112 of the rotor 302 remain substantially parallel to the bearing surfaces 112 of the stator 304 during use.

Figure 4A:
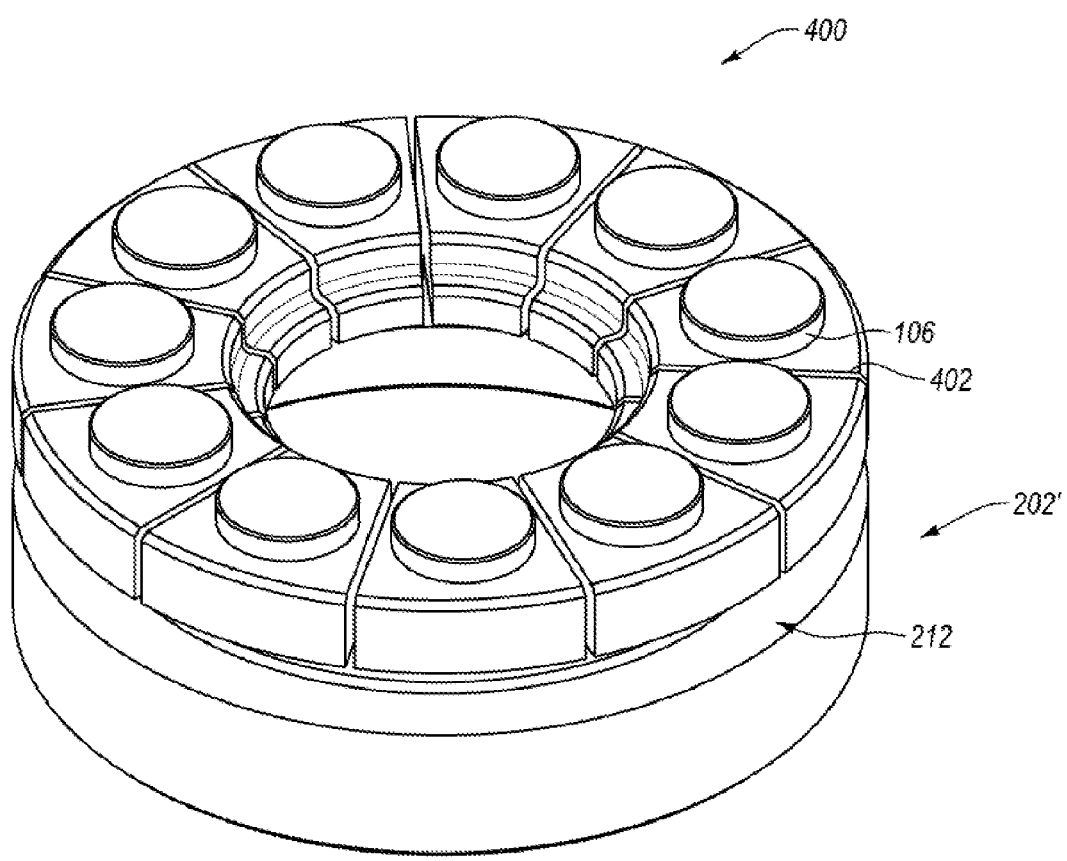
FIG. 4A is an isometric view of an embodiment of a thrust-bearing assembly including a support ring having a plurality of radially-extending slots therein configured to reduce warping under operational temperature conditions to accommodate thermal warping of another thrust-bearing assembly.
Figure 4B:
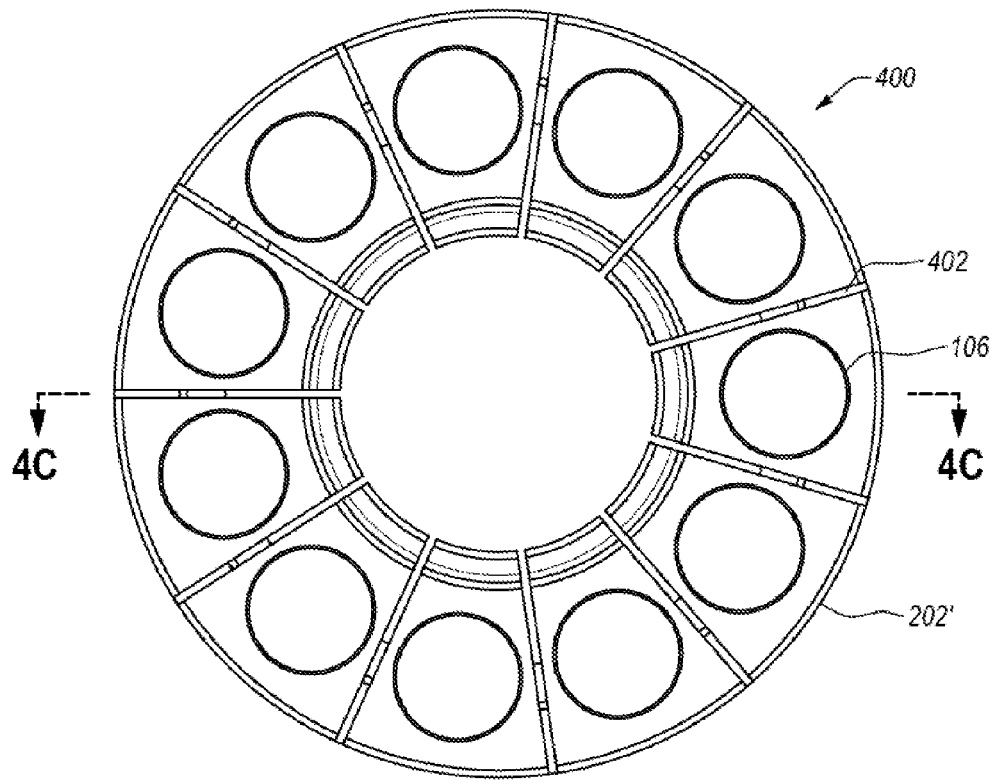
FIG. 4B is a top plan view of the thrust-bearing assembly shown in FIG. 4A.
Figure 4C:
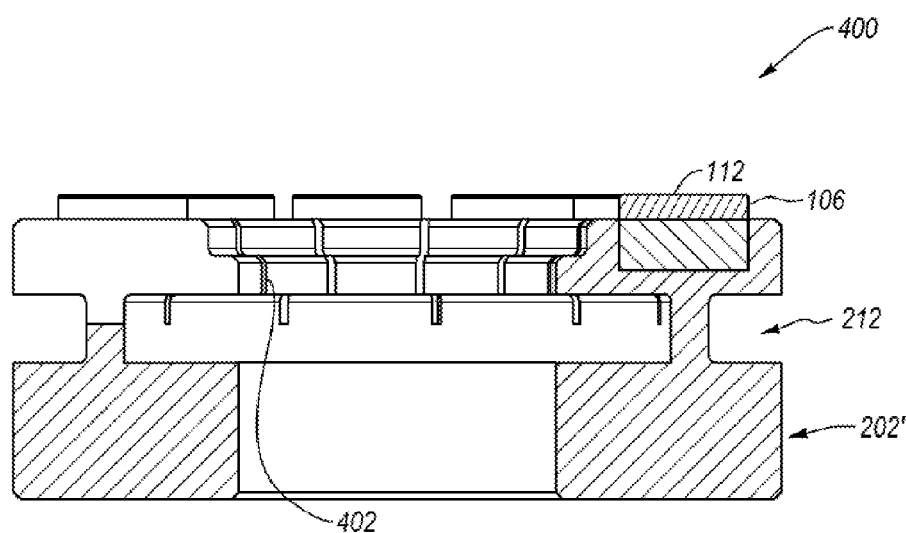
FIG. 4C is a cross-sectional view of the thrust-bearing assembly shown in FIG. 4B taken along line 4C-4C.

FIGS. 4A-4C are isometric, top plan, and side cross-sectional views of an embodiment of a thrust-bearing assembly 400 including a support ring having a plurality of radially-extending slots therein configured to reduce warping under operational temperature conditions and flex to accommodate thermal warping of another thrust-bearing assembly. The thrust-bearing assembly 400 includes a support ring 202' similarly configured to the support ring 202 of the thrust-bearing assembly 200 shown in FIGS. 2A-2D. However, in addition to the circumferentially-extending recess 212, the support ring 202' also includes a plurality of thermal-warping-reducing features 402, which compared to if they were absent, increase the compliance of the support ring 202' and reduce a radial moment that is thermal induced in the support ring due to a temperature gradient in the support ring 202'.

In the illustrated embodiment, each thermal-warping-reducing feature 402 is configured as a radially-extending slot that extends only partially through the support ring 202' in a thickness direction. Each radially-extending slot 402 may be disposed between immediately adjacent superhard bearing elements 106. For example, each radially-extending slot 402 may exhibit a width of about 0.0020 inch to about 0.100 inch, such as about 0.030 inch to about 0.050 inch, about 0.035 inch to about 0.045 inch, or about 0.010 inch to about 0.040 inch. However, in other embodiments, at least one, a portion of, or all of the thermal-warping-reducing features 402 may be configured as a recess, a blind or through hole, or other feature that departs from the depicted elongated geometry of the radially-extending slots. As previously discussed, the radially-extending slots 402 increase the compliance of the support ring 202' compared to if they were absent. By increasing the compliance of the support ring 202', a radial moment that is thermally induced in the support ring 202' due to the temperature gradient in the support ring 202' may also be reduced enabling the bearing surfaces 112 of the superhard bearing elements 106 to be displaced out of the plane (if at all) by a relatively small amount.

In some embodiments, both the stator and rotor of a thrust-bearing apparatus may be configured as the thrust-bearing assembly 400. In other embodiments, either the rotor or the stator of a thrust-bearing apparatus may be configured as the thrust-bearing assembly 400.

Figure 5:
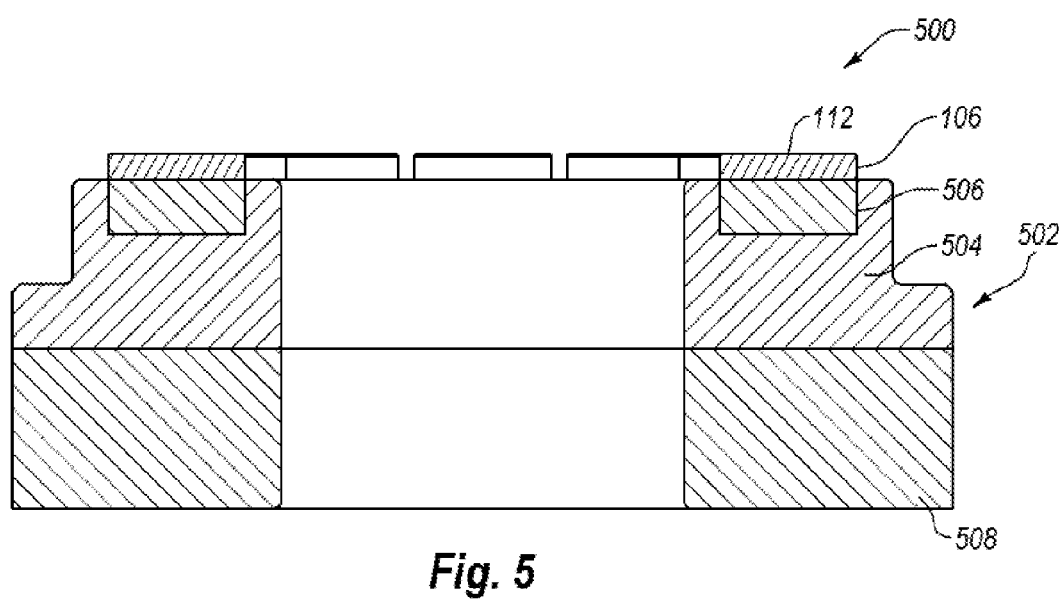
FIG. 5 is a side cross-sectional view of an embodiment a thrust-bearing assembly having a bi-material support ring that is configured to compensate for thermal warping due to a thermal gradient the bi-material support ring.

As an alternative to or in addition to employing radially-extending slots as thermal-warping-reducing features to reduce thermal warping of a thrust-bearing assembly when exposed to elevated operational temperature conditions, the support ring may be made from a bi-material structure that is designed to compensate for the thermal expansion mismatch with the superhard bearing elements 106. FIG. 5 is a side cross-sectional view of an embodiment of a thrust-bearing assembly 500 having a bi-material support ring 502 that is configured to compensate for thermal warping due to a temperature gradient in the support ring 502. The thrust-bearing assembly 500 may be used as in combination with the thrust-bearing assembly 200 shown in FIGS. 2A-2D to form a thrust-bearing apparatus. The support ring 502 is configured similarly to the support ring 102 shown in FIGS. 1A-1D so only the differences between the support rings 102 and 502 are discussed in the interest of brevity.

The support ring 502 includes a first ring portion 504 including a plurality of circumferentially-spaced recesses 506, with each recess 506 having one of the superhard bearing elements 106 mounted partially therein. The first ring portion 504 exhibits a first thermal expansion coefficient that is less than that of a second ring portion 508 that is bonded to the first ring portion 504. For example, the first ring portion 504 may comprise an iron-based alloy, such as stainless steel or carbon steel. The second ring portion 508 exhibits a second thermal expansion coefficient that is greater than that of the first thermal expansion coefficient the first ring portion 504. The second ring portion 508 may comprise, for example, a copper alloy, an aluminum alloy, brass, or another suitable material with a thermal expansion coefficient that is greater than that of the first ring portion 504. The thickness of the first ring portion 504 may be approximately the same as the thickness of the second ring portion 508.

When the thrust-bearing assembly 500 is exposed to operational temperature conditions, the second ring portion 508 induces a thermally-induced radial moment that counters the thermally-induced radial moment due to the thermal gradient in the support ring 502 so that the bearing surfaces 112 are displaced out of plane (if at all) about the same extent or less than in the thrust-bearing assembly 100. Accordingly, the second ring portion 508 is configured with a thickness and a coefficient of thermal expansion so that the thermally-induced radial moment counters the thermally-induced radial moment due to a temperature gradient in the support ring 502, with temperature increasing with distance toward the bearing surfaces 112 of the superhard bearing elements 106 (i.e., the temperature is hottest at the bearing surfaces 112). Thus, the second ring portion 508 functions as a thermal-warping-reducing feature.

The support ring 502 may be manufactured by a number of different processes. For example, the first and second ring portions 504 and 508 may formed integrally together via a powder metallurgy process or separately formed and joined together via brazing, diffusion bonding, mechanical fastening, or another suitable joining technique.

Although the bearing assembly and apparatus embodiments discussed above are for thrust-bearing assemblies and apparatuses. The teachings of the bearing assembly and apparatus embodiments discussed above may be adapted to radial bearing assemblies and apparatuses.

Testing was performed to measure the break-in time for the bearing surfaces of the thrust-bearing apparatuses configured in accordance with various embodiments of the invention. The break-in time is the time at which the bearing surfaces of the rotor and stator of the thrust-bearing apparatus are uniformly worn. The break-in time is indicative of the ability of the stator and/or the rotor to accommodate misalignment between the bearing surfaces. A lower break-in time may correlate with improved hydrodynamic performance.

The bearing elements of the thrust-bearing apparatuses tested were PDCs having approximately a 0.528 inch diameter and an unleached polycrystalline diamond table. During the testing, the rotor was rotated at about 400 RPM and the thrust load was ramped up to about 25,000 pounds in about 15 minutes. The thrust load of about 25,000 pounds was maintained for about 30 minutes, after which the bearing surfaces were examined visually to determine how the bearing surfaces had worn. After examination of the bearing surfaces, the loading and visual inspection was repeated, as previously described, until the bearing surfaces were uniformly worn (i.e., broke in).

Table I below lists the configurations of the thrust-bearing apparatuses tested. "Nonconforming" means that the stator or rotor lacked radially-extending slots 116 as shown in the thrust-bearing assembly 100 of FIGS. 1A-1D and lacked a circumferentially-extending recess 212 as shown in FIGS. 2A-2D. In Table I below, when the stator or rotor configuration recites "conforming," it means that the support ring included a circumferentially-extending recess similar to the circumferentially-extending recess 212 of the thrust-bearing assembly 200 shown in FIGS. 2A-2D. In Table I below, when the stator or rotor configuration recites "slots," it means that the support ring included radially-extending slots between circumferentially adjacent PDCs similar to the radially-extending slots 116 shown in the thrust-bearing assembly 100 of FIGS. 1A-1D. In Table I below, when the stator or rotor configuration recites "slots and conforming," it means that the support ring included radially-extending slots between circumferentially adjacent PDCs similar to the radially-extending slots 116 shown in the thrust-bearing assembly 100 of FIGS. 1A-1D and that the support ring also included a circumferentially-extending recess similar to the circumferentially-extending recess 212 of the thrust-bearing assembly 200 shown in FIGS. 2A-2D.

TABLE I

Break-in-Times for Various Thrust-Bearing Apparatus Embodiments

| Thrust-Bearing Apparatus No. | Stator Configuration | Rotor Configuration | Break-in Time (hours) |
| --- | --- | --- | --- |
| 1 | nonconforming | nonconforming | 4 |
| 2 | conforming | conforming | 2 |
| 3 | conforming | nonconforming | 2.5 |
| 4 | nonconforming | conforming | 1.5 |
| 5 | slots | slots | 1.5 |
| 6 | conforming | slots | 4 |
| 7 | slots | conforming | 2 |
| 8 | nonconforming | slots | 3.5 |
| 9 | slots | nonconforming | 2 |
| 10 | slots and conforming | nonconforming | 1.5 |
| 11 | slots and conforming | slots | 1 |
| 12 | slots and conforming | conforming | 1 |

As shown in the test data of Table I, the thrust-bearing apparatus nos. 11 and 12 had the lowest break-in time. Consequently, it is believed the thrust-bearing apparatus nos. 11 and 12 will have the best hydrodynamic performance.

It is currently believed by the inventors that the ability of the rotor and/or the stator to flex and/or to reduce thermal warping helps enable a fluid film to develop during use and make hydrodynamic operation possible. For example, testing of thrust-bearing apparatuses structured and fabricated in accordance with one or more embodiments of the invention have shown as the axial load between the rotor and the stator is linearly increased, the torque required to continue rotating the rotor at a given rotation rate increases dramatically at a certain load indicative of a fluid film breaking down between the bearing surfaces of the rotor and the stator. Thus, with a significant enough axial load, the test data indicated that the operation of the thrust-bearing apparatus changes from hydrodynamic operation to non-hydrodynamic operation in which the bearing surfaces of the rotor and the stator are in physical contact with each other due to the breakdown of the fluid film. One reason that the ability of the disclosed thrust-bearing apparatuses to operate in the hydrodynamic operating regime is unexpected is because the stator of such thrust-bearing apparatus includes a plurality of discrete bearing surfaces and superhard bearing elements (see bearing surfaces 112 of superhard bearing elements 106 in FIG. 1A) as opposed to a continuous bearing surface.

Figure 6:
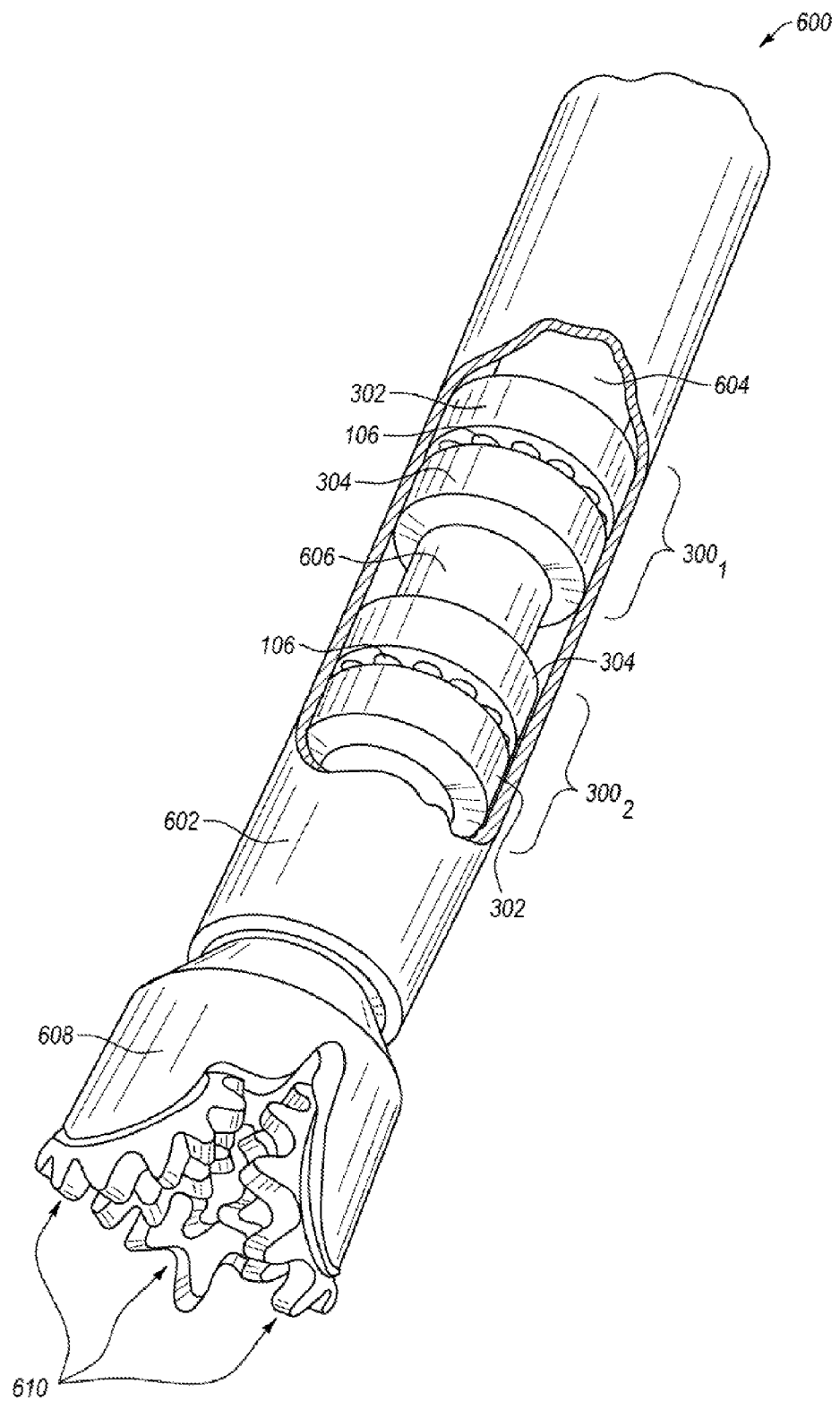
FIG. 6 is a schematic isometric cutaway view of an embodiment of a subterranean drilling assembly that may include one or more of the disclosed thrust-bearing apparatuses.

Any of the embodiments for thrust-bearing apparatuses disclosed herein may be used in a subterranean drilling system. FIG. 6 is a schematic isometric cutaway view of a subterranean drilling system 600 that includes one or more of the disclosed thrust-bearing apparatuses, such as the thrust-bearing apparatus 300 shown in FIGS. 3A and 3B. The subterranean drilling system 600 includes a housing 602 enclosing a downhole drilling motor 604 (i.e., a motor, turbine, or any other device capable of rotating an output shaft) that is operably connected to an output shaft 606. A first thrust-bearing apparatus $300_1$ (FIG. 3A) is operably coupled to the downhole drilling motor 604. A second thrust-bearing apparatus $300_2$ (FIG. 3A) is operably coupled to the output shaft 606. A rotary drill bit 608 configured to engage a subterranean formation and drill a borehole is connected to the output shaft 606. The rotary drill bit 608 is shown as a roller cone bit including a plurality of roller cones 610. However, other embodiments may utilize different types of rotary drill bits, such as a so-called "fixed cutter" drill bit. As the borehole is drilled with the rotary drill bit 608, pipe sections may be connected to the subterranean drilling system 600 to form a drill string capable of progressively drilling the borehole to a greater depth within the earth.

A thrust-bearing assembly 302 of the thrust-bearing apparatus $300_1$ is configured as a rotor that is attached to the output shaft 606 and rotates with the output shaft 606 and a thrust-bearing assembly 304 of the thrust-bearing apparatus 300₁ is configured as a stator that does not rotate. The on-bottom thrust generated when the drill bit 608 engages the bottom of the borehole may be carried, at least in part, by the first thrust-bearing apparatus 300₁. A thrust-bearing assembly 302 of the thrust-bearing apparatus 300₂ is configured as a rotor that is attached to the output shaft 606 and rotates with the output shaft 606 and a thrust-bearing assembly 304 of the thrust-bearing apparatus 300₂ is configured as a stator that does not rotate. Fluid flow through the power section of the downhole drilling motor 604 may cause what is commonly referred to as "off-bottom thrust," which may be carried, at least in part, by the second thrust-bearing apparatus 300₂.

In operation, drilling fluid may be circulated through the downhole drilling motor 604 to generate torque and effect rotation of the output shaft 606 and the rotary drill bit 608 attached thereto so that a borehole may be drilled. A portion of the drilling fluid may also be used to lubricate opposing bearing surfaces of the bearing elements 106 of the thrust-bearing assemblies 302.

Although the thrust-bearing assemblies and thrust-bearing apparatuses described above have been discussed in the context of subterranean drilling systems and applications, in other embodiments, the thrust-bearing assemblies and thrust-bearing apparatuses disclosed herein are not limited to such use and may be used for many different applications, if desired, without limitation. Thus, such thrust-bearing assemblies and thrust-bearing apparatuses are not limited for use with subterranean drilling systems and may be used with various other mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A bearing assembly, comprising:
   a plurality of superhard bearing elements distributed circumferentially about an axis, each of the plurality of superhard bearing elements having a superhard bearing surface, the superhard bearing surfaces are substantially coplanar with each other; and
   a support ring having a plurality of recesses, each of the plurality of superhard bearing elements mounted at least partially within a corresponding one of the plurality of recesses, the support ring exhibiting compliance that enables the plurality of superhard bearing elements to remain substantially coplanar with each other at an out-of-plane displacement of 0.00020 inch to about 0.0020 inch when the support ring and the plurality of superhard bearing elements are under operational temperature conditions between 100° C. and 150° C.

2. The bearing assembly of claim 1 wherein the out-of-plane displacement is 0.0005 inch to about 0.0010 inch when the support ring and the plurality of superhard bearing elements are exposed to the operational temperature conditions.

3. The bearing assembly of claim 1 wherein:
   each of the plurality of recesses extends inwardly and terminates at a first depth; and
   the support ring includes a plurality of radially-extending slots, each of the plurality of radially-extending slots disposed between immediately circumferentially adjacent ones of the plurality of superhard bearing elements, each of the plurality of radially-extending slots extending into the support ring to at least the first depth.

4. The bearing assembly of claim 3 wherein each of the radially-extending slots exhibit a width greater than about 0.0020 inch.

5. The bearing assembly of claim 4 wherein the width is about 0.0020 inch to about 0.100 inch.

6. The bearing assembly of claim 4 wherein the width is about 0.010 inch to about 0.040 inch.

7. The bearing assembly of claim 3 wherein each of the plurality of radially-extending slots is disposed circumferentially about halfway between the immediately adjacent ones of the plurality of superhard bearing elements.

8. The bearing assembly of claim 1 wherein the support ring includes a first support ring portion exhibiting a first thermal expansion coefficient and a second support ring portion joined to the first support ring portion that exhibits a second thermal expansion coefficient that is greater than the first thermal expansion coefficient.

9. The bearing assembly of claim 1 wherein at least a portion of the plurality of superhard bearing elements include a substrate and a polycrystalline diamond table bonded to the substrate.

10. The bearing assembly of claim 1 wherein each of the plurality of superhard bearing elements is brazed, interference-fitted, or fastened to the support ring.

11. The bearing assembly of claim 1 wherein the axis is a thrust axis, and wherein the support ring and the plurality of superhard bearing elements define a thrust-bearing assembly.

12. A bearing assembly, comprising:
    a plurality of superhard bearing elements distributed circumferentially about an axis, each of the plurality of superhard bearing elements having a superhard bearing surface, the superhard bearing surfaces lying substantially on the same imaginary surface; and
    a support ring, the support ring including:
       a first support ring portion exhibiting a first thermal expansion coefficient and a first thickness, the first support ring portion having the plurality of superhard bearing elements mounted thereon; and
       a second support ring portion joined to the first support ring portion, the second support ring having a second thickness that is approximately the same as the first thickness and exhibiting a second thermal expansion coefficient that is greater than the first thermal expansion coefficient, the first and second support ring portions collectively configured such that the plurality of superhard bearing elements remain substantially coplanar with each other at an out-of-plane displacement of 0.00020 inch to about 0.0020 inch when the support ring and the plurality of superhard bearing elements are under operational temperature conditions between 100° C. and 150° C.

13. The bearing assembly of claim 12 wherein the out-of-plane displacement is 0.0005 inch to about 0.0010 inch when the support ring and the plurality of superhard bearing elements are exposed to the operational temperature conditions.

14. The bearing assembly of claim 12 wherein the second support ring portion includes at least one of a copper alloy, an aluminum alloy, or brass, and the first support ring portion includes stainless steel or carbon steel.

15. The bearing assembly of claim 12 wherein the first support ring portion and the second support ring portion are brazed together, diffusion bonded together, or mechanically fastened together.

16. The bearing assembly of claim 12 wherein at least a portion of the plurality of superhard bearing elements include a substrate and a polycrystalline diamond table bonded to the substrate.

17. The bearing assembly of claim 12 wherein each of the plurality of superhard bearing elements is brazed, interference-fitted, or fastened to the support ring.

18. The bearing assembly of claim 12 wherein the axis is a thrust axis, and wherein the support ring and the plurality of superhard bearing elements define a thrust-bearing assembly.

19. A bearing assembly, comprising:
a plurality of superhard bearing elements distributed circumferentially about an axis, each of the plurality of superhard bearing elements including a superhard bearing surface, the superhard bearing surfaces of the plurality of superhard bearing elements lying substantially on the same imaginary surface; and
a support ring having a plurality of recesses each extending inwardly and terminating at a first depth, each of the plurality of superhard bearing elements mounted at least partially within a corresponding one of the plurality of recesses, the support ring including:
a plurality of slots formed in the support ring, each of the plurality of slots disposed between immediately circumferentially adjacent ones of the plurality of superhard bearing elements, each of the plurality of slots extending into the support ring to at least the first depth, the plurality of slots increasing compliance of the support ring during use compared to if the plurality of slots were not present in the support ring.

20. The bearing assembly of claim 19 wherein the imaginary surface is a plane, the axis is a thrust axis, and each of the plurality of slots are radially extending.

21. The bearing assembly of claim 19 wherein each of the plurality of slots is disposed circumferentially between a respective pair of immediately circumferentially adjacent ones of the plurality of superhard bearing elements.

22. The bearing assembly of claim 19 wherein each of the plurality of slots exhibit a width greater than about 0.0020 inch.

23. The bearing assembly of claim 22 wherein the width is about 0.0020 inch to about 0.100 inch.

24. The bearing assembly of claim 22 wherein the width is about 0.010 inch to about 0.040 inch.

* * * * *